United States Patent [19]

Weirs

[11] Patent Number: 5,340,201
[45] Date of Patent: Aug. 23, 1994

[54] SNAP-ON DRESS WHEEL SIMULATOR
[75] Inventor: Gary Weirs, McKenzie, Tenn.
[73] Assignee: Del-Met Corporation, Hendersonville, Tenn.
[21] Appl. No.: 85,026
[22] Filed: Jun. 30, 1993
[51] Int. Cl.$^5$ .............................................. B60B 7/12
[52] U.S. Cl. ............................ 301/37.26; 301/37.42; 301/37.32
[58] Field of Search ................. 301/37.1, 37.31, 37.32, 301/37.34, 37.35, 37.36, 37.37, 108.1, 108.4, 37.42

[56] References Cited

U.S. PATENT DOCUMENTS

| | | | |
|---|---|---|---|
| 2,113,541 | 4/1938 | Blank | 301/37.36 |
| 2,842,405 | 7/1958 | Lyon | 301/37.36 |
| 2,865,680 | 12/1958 | Lyon | 301/37.36 |
| 2,878,072 | 3/1959 | Lyon | 301/37.35 |
| 3,876,257 | 4/1975 | Buerger . | |
| 4,363,520 | 12/1982 | Connell | 301/37.42 |
| 4,606,582 | 8/1986 | Warren . | |
| 4,787,681 | 11/1988 | Wang et al. | 301/108.4 X |
| 5,031,965 | 7/1991 | Buerger . | |

FOREIGN PATENT DOCUMENTS 3704384 8/1988 Fed. Rep. of Germany ... 301/37.36

Primary Examiner—Russell D. Stormer
Attorney, Agent, or Firm—Natter & Natter

[57] ABSTRACT

A snap-on dress wheel simulator for applications such as utility and recreational vehicles including motor coaches, trucks and the like, includes a unitary sheet metal shell formed of a central hub cover and an annular dished ring which are permanently joined. The shell also carries lug nut covers and a metal grip ring having teeth which engage a safety hub of the vehicle wheel rim. The grip ring is seated in an annular channel of a molded plastic mounting collar. The collar includes an enlarged outer peripheral bead and the peripheral edge of the shell is crimped around the collar bead to fasten the collar to the shell.

10 Claims, 2 Drawing Sheets

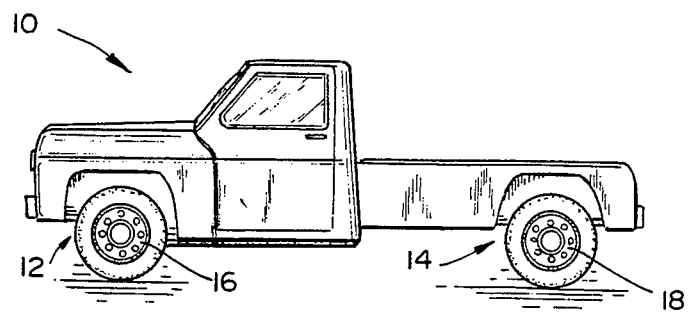
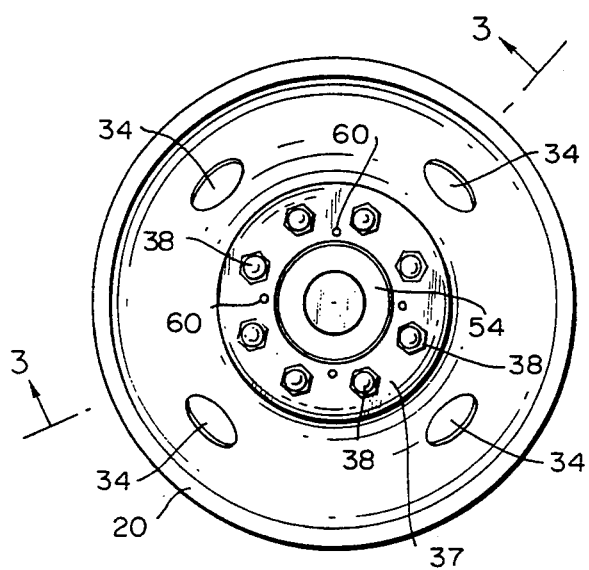
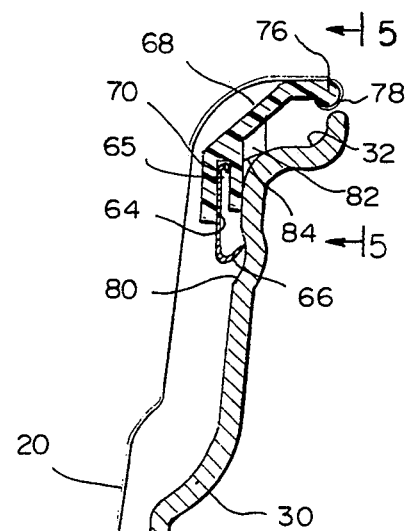
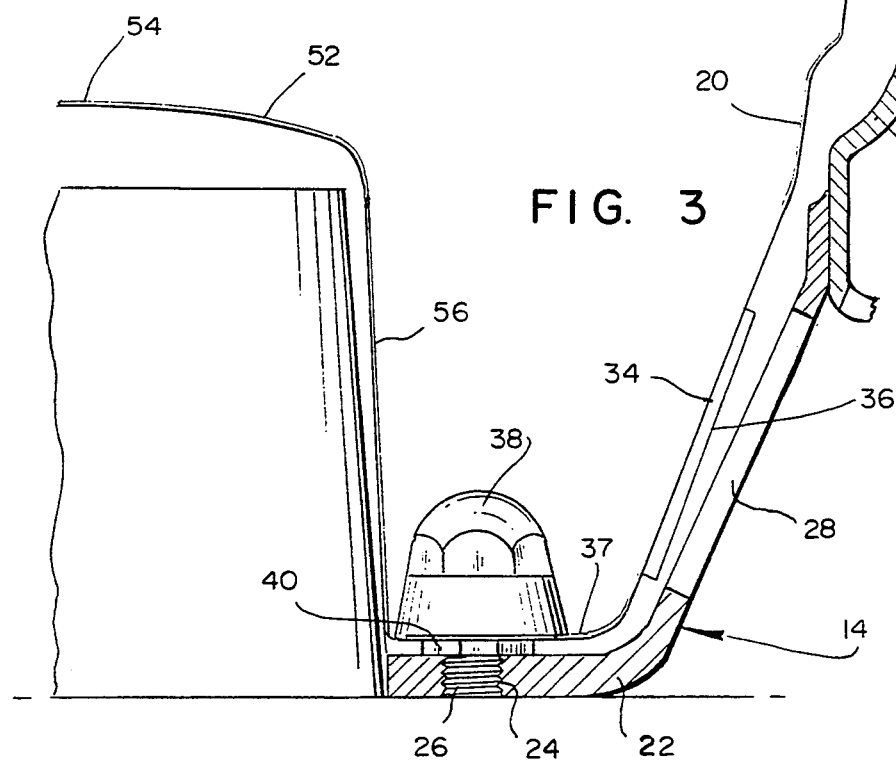

SNAP-ON DRESS WHEEL SIMULATOR

FIELD OF THE INVENTION

This invention relates generally to dress wheel simulators for utility vehicles including recreational vehicles and more particularly to simulators which are retained on vehicle wheels by engagement with the wheel rim, rather than with lug nuts.

RELATED HISTORY

Numerous problems have been encountered with respect to providing contoured wheel covers which emulated the shape of utility vehicle wheels and which have been referred to as wheel skins or simulators. Mounting systems were devised which utilized existing wheel lugs and lug nuts to secure simulators to the wheels.

For example, in U.S. Pat. No. 4,606,582, a utility vehicle simulator included a wheel rim and web cover and a separate wheel hub cover, both of which were provided with apertures which were registered with the vehicle's wheel lugs. In order to mount the simulator, it was required to lift the wheel from the ground, remove all wheel lug nuts and a factory equipped compression plate, place the wheel rim and web cover over the lugs, replace the compression plate and then place the hub cover over the lugs after which lug nuts were resecured and lug nut covers were individually applied to each lug nut. Such installation was difficult, time consuming, required the assembly of numerous components, and also involved a safety risk. Significantly, the compression plate was factory specified to be applied directly against the wheel and the wheel was no longer mounted as specified.

In the wheel simulator disclosed in U.S. Pat. No. 5,031,965, assigned to the assignee of the present invention, only selected lug nuts were required to be removed and the factory provided compression plate remained in its specified position. Jacking of the vehicle was not required to mount the covers.

Vehicle manufacturers have recently recommended that in order to assure secure mounting of a vehicle wheel, nothing be positioned between the wheel lug nuts and the vehicle wheel, except the factory supplied compression plate on vehicles so equipped.

Molded thermoplastic wheel covers having annular metal rings for gripping a wheel rim have been employed in conjunction with smaller diameter automobile wheels. See, for example, U.S. Pat. No. 3,876,257, assigned to the assignee of the present invention. Plastics were, however, unsuitable for the larger diameter wheels, especially for contoured simulator applications. Among the factors which rendered plastics unsuitable included the fact that such applications subjected wheel covers to considerable stress and plastics did not provide sufficient durability. Further, wheels positioned at the rear of a utility vehicle often included a projecting central hub and were relatively deeply dished. Conventional chrome plating techniques were impractical for such applications.

Additionally, metal wheel covers having a plastic collar which carried a metal grip ring have been available. Such wheel covers merely covered the face of the wheel and failed to provide a true simulation of a deeply dished utility wheel.

SUMMARY OF THE INVENTION

In compendium, the invention comprises a dress wheel simulator for wheels of utility vehicles such as trucks, coaches, motor homes and recreational vehicles. The dress wheel simulator includes a unitary sheet metal shell formed of stainless steel or chrome plated steel and which is contoured to closely conform to the shape of the wheel. The shell is constructed of a web or disc having a central opening and a domed sheet metal hub cover. The hub cover projects through the central opening and is permanently secured to the web. The web also carries lug nut covers which extend through notched openings in the web.

A molded plastic collar includes a peripheral bead and is positioned adjacent the interior face of the shell. The peripheral edge of the shell Is crimped around the bead of the collar.

The collar includes an axially inwardly facing annular channel within which is seated a metal grip ring. Barbs project radially from the axially outer longitudinal edge of the grip ring and engage a side wall of the channel to retain the grip ring in the channel.

Radially outwardly projecting spring biased teeth are formed at the opposite axial inner longitudinal edge and engage an annular safety hump in the wheel rim to secure the simulator to the wheel. The collar also includes a plurality of spaced radial flanges which engage the wheel weight channel to assure that the simulator is properly positioned on the wheel.

From the foregoing compendium, it will be appreciated that it is an aspect of the present invention to provide a snap-on dress wheel simulator of the general character described which is not subject to the disadvantages of the background history aforementioned.

It is a consideration of the present invention to provide a snap-on dress wheel simulator of the general character described which is suitable for economical mass production fabrication.

A feature of the present invention is to provide a snap-on dress wheel simulator of the general character described which does not require removal of vehicle lug nuts for mounting.

To provide a snap-on dress wheel simulator of the general character described with enhanced durability and reduced weight is another feature of the present invention.

A further aspect of the present invention is to provide a snap-on dress wheel simulator of the general character described which does not require the use of separate lug nut covers.

Another consideration of the present invention is to provide a snap-on dress wheel simulator of the general character described the use of which is in compliance with factory wheel mounting specifications.

An additional feature of the present invention is to provide a snap-on dress wheel simulator of the general character described which employs an annular grip ring having wheel rim engaging teeth is yet another feature of the present invention.

Still another consideration of the present invention is to provide a snap-on dress wheel simulator of the general character described which is mounted to and removed from a utility vehicle wheel as a unitary component.

Other aspects, features and considerations in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention, FIG. 1 is a side elevational view of a typical utility vehicle having wheels on which are mounted snap-on dress wheel simulators constructed in accordance with and embodying the invention;

FIG. 2 is an elevational view of a snap-on dress wheel simulator constructed in accordance with the invention and mounted to a rear wheel;

FIG. 3 is an enlarged scale fragmentary sectional view through the simulator and the rear wheel, the same being taken substantially along the plane 3—3 of FIG. 2 and showing a plastic mounting collar secured to a peripheral edge of the simulator and carrying e grip ring;

DESCRIPTION OF THE PREFERRED EMBODIMENTS

Figure 4:
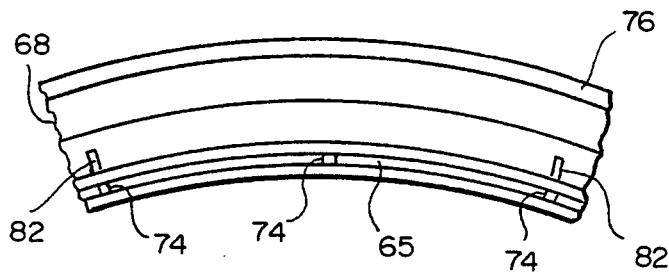
FIG. 4 is a fragmentary plan view of the mounting collar without the grip ring and showing a channel which receives the grip ring as well as a plurality of anti-rotation webs extending between the walls of the channel and which engage notches formed in the grip ring.
Figure 5:
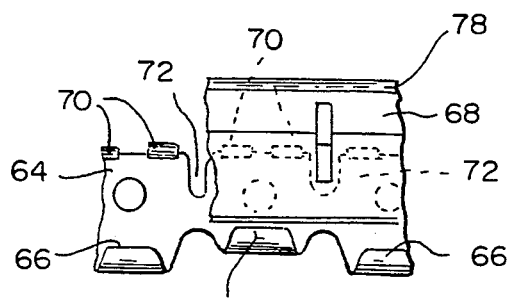
FIG. 5 is a fragmentary elevational auxiliary view taken substantially along the plane 5—5 of FIG. 3 with the wheel deleted and showing the grip ring with portions of the mounting collar broken away.
Figure 6:
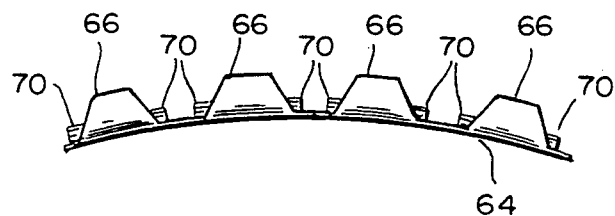
FIG. 6 is a fragmentary bottom view of the grip ring and showing a plurality of radially outwardly projecting spring biased teeth which engage the rim of the vehicle wheel.

Referring now in detail to the drawings, the reference numeral 10 denotes generally a typical utility vehicle having a pair of front wheels 12 and a pair of rear wheels 14. The wheels 12, 14 are conventional or stock steel wheels. Typically, the front wheel is less severely contoured or dished than the rear wheel and the rear wheel includes a central aperture through which projects a vehicle hub. Often, a single wheel is utilized with the wheel mounted on the front axle being the same as the wheel mounted on the rear axle however, the opposite face of the wheel is mounted to the axle.

The front wheel 12 is covered by a wheel cover 16 and the rear wheel 14 is covered by a snap-on dress wheel simulator 18. The wheel simulator 18 is preferably fabricated of sheet metal, typically polished stainless steel such as 300 series stainless steels or may comprise sheet steel to which is applied a suitable surface treatment such as chrome plating or paint.

Although the simulator 18 is fabricated of several components, the components are assembled to provide a unitary composite structure which is handled, i.e. mounted to and removed from the respective vehicle wheel, as a single unit.

The wheel simulator 18 includes a sheet metal shell 20 of circular plan configuration and which is contoured to conform to or accommodate the shape of the rear wheel 14. As illustrated in FIG. 3, the rear wheel 14 comprises a central web portion 22 which includes suitable lug holes 24 registered with wheel lugs 26 and a plurality of vent apertures 28. The web 22 extends radially and axially outwardly to a wheel rim 30, which carries a tire. The wheel rim 30 includes a tire bead flange and an outwardly projecting lip which forms a wheel weight channel 32.

As illustrated in FIG. 3, the rear wheel 14 is a typical deep dish contoured wheel with the wheel web 22 including a central annular planar portion which extends perpendicular to the axis of the wheel. The axially outer tire bead flange of the wheel rim 30 is spaced from the annular planar portion of the web 22 an axial distance in the order of twice the radius of the annular planar portion.

The simulator shell 20 extends radially and axially inwardly from its periphery and includes a plurality of apertures 34 in registration with the vent apertures 28 in the wheel web 22. Each of the apertures 34 is configured with an axially inwardly bent lip to provide a smooth surface and prevent injury during mounting or removal of the simulator.

Axially inwardly from the apertures 34, the shell 20 includes a flat annular gudgeon portion 37 which extends in a radial direction. At the gudgeon portion 37, the shell 20 carries a plurality of lug nut covers 38. Each lug nut cover 38 is secured within an aperture of the shell 20 and includes a hollow interior suitable to accommodate a lug nut 40 of the vehicle. The lug nut covers 38 register with the lug nuts 40 of the vehicle wheel when the simulator 18 is mounted although the gudgeon potion 37 may be spaced from the web 22 a sufficient axial distance so as to clear the ends of the lugs 26, in which case registration of the lug nut covers with the lug nuts 40 is not required.

Figure 7:
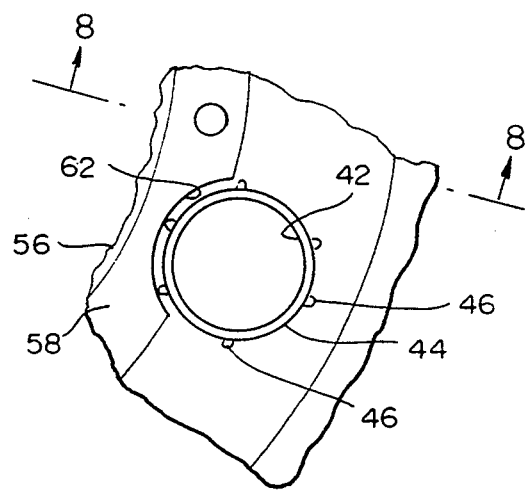
FIG. 7 is a fragmentary bottom view of the simulator.
Figure 8:
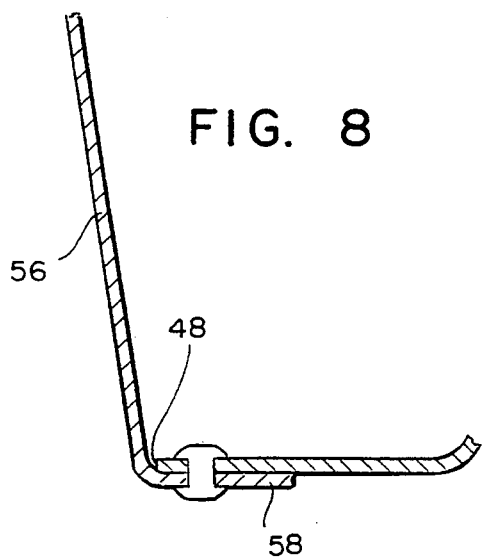
FIG. 8 is an enlarged scale fragmentary sectional view through the simulator, the same being taken along the plane 8—8 of FIG. 7.

Each lug nut cover 38 includes a shank portion 42 which extends through an aperture 44 formed in the gudgeon 37, as illustrated in FIG. 7. A plurality of evenly spaced notches 46 surround the aperture 44 within which the shank 42 is seated and permit the sheet metal of the shell 20 to flex for spring grip engagement against the shank 42. When assembling the simulator, the shanks 42 are forced through the notched apertures and the spring engagement permanently locks the nut covers 38 in place.

Radially inwardly of the lug nut apertures 44, the gudgeon 37 includes a central opening 48 of a diameter sufficient to accommodate an axle hub 50, which is covered by a domed sheet metal hub cover 52.

The hub cover 52 includes a cap portion 54 and a frustum wall 56. At the base of the frustum wall 56, a radial flange 58 is provided. The flange 58 is secured against the axially inner face of the gudgeon 37. For such purpose, the flange 58 includes holes which are registered with holes in the gudgeon 37 and through which rivets 60 are driven. The flange 58 includes arcuate out outs 52 for accommodating the shanks 42 of the lug nut covers 38 and for facilitating assembly of the shell 20.

It should be appreciated that the shell 20, the lug nut covers 38 and the hub cover 52 are components which are unitarily scoured together at the manufacturing or assembly facility and are not individually mounted to the vehicle wheel.

The dress wheel simulator 18 is secured to the wheel 14 by a retention system which includes an annular metal grip ring 64. The grip ring 64 is configured substantially identical to the grip ring disclosed in U.S. Pat. No. 3,876,257 incorporated herein by reference, and is seated within a channel 65 formed in an annular collar 68. The grip ring 64 is formed of sheet spring steel and includes, along its axially inner longitudinal edge, a plurality of evenly spaced teeth 66 which are radially outwardly bent to engage the wheel rim 30. The teeth 66 are spaced from one another by cut-away portions of the ring.

The width of the grip ring 64 at alternate teeth 66 may be shorter than the width at the remaining teeth to provide bi-level tooth engagement with the wheel 14 at the wheel rim 30, thus assuring secure retention of the simulator 18.

Along the opposite, axially outer longitudinal edge of the grip ring 64, a plurality of radially outwardly projecting barbs 70 bite into the radially outer wall of the channel 65. The outer longitudinal edge of the grip ring 64 additionally includes evenly spaced notches 72, positioned to be in registry with a plurality of evenly spaced anti-rotation webs 74 which extend across the walls of the channel 65. Rotation of the grip ring 64 relative to the annular collar 68 is precluded by engagement between the webs 74 and the notches 72.

At its radially outer edge, the collar 64 includes an enlarged peripheral bead 76. An annular peripheral crimp 78 of the shell 20 tightly engages the bead 76 to secure the collar to the shell.

As illustrated in FIG. 3, when the simulator 18 is mounted to the wheel 14, the teeth 66 engage the wheel rim 30 at an annular bulge or safety hump 80. It should also be noted that the collar 68 includes a plurality of evenly spaced flanges 82. The flanges 82 project radially outwardly a distance sufficient to engage the wheel weight channel 32 while the cylindrical wall of the collar 68 which forms the channel 65 extends axially inwardly beyond the wheel weight channel.

A bottom surface 84 of each radial flange 82 is sloped for engagement with a shoulder between the wheel weight channel 32 and the remainder of the wheel rim 30 to provide both an axial abutment stop for seating the simulator on the wheel 14 and, in addition, for radial centering.

The shell 20 of the snap-on wheel simulator 18, is fabricated of a sheet metal, preferably stainless steel, but may also include a suitable sheet steel having an appropriate surface coating including chrome plating, painting, etc. The grip ring 64 is preferably formed of sheet spring steel such as stainless steel (301, 201 or similar stainless steels). The annular collar 68 is preferably injection molded of a light weight durable thermoplastic such as acrylonitrile-butadiene-styrene.

Thus it will be seen that there is provided a snap-on wheel simulator which achieves the various aspects, features and considerations of the present invention and which is well suited to meet the conditions of practical usage.

Since various possible embodiments might be made of the snap-on dress wheel simulator of the present invention and various changes might be made of the exemplary embodiment set forth herein without departing from the spirit of the invention, it is to be understood that all matter herein described or shown in the accompanying drawings is to be interpreted as illustrative and not in a limiting senses.

Having thus described the invention, there is claimed as new and desired as to be secured by Letters Patents:

1. A unitary assembly snap-on dress wheel simulator for utility vehicle wheels, the simulator comprising a sheet metal shell having a circular periphery, the shell being contoured to generally conform to the shape of a utility vehicle wheel, the shell including a first portion extending from the circular periphery toward the center of the shell, the first portion having a central opening of a dimension suitable to accommodate a utility vehicle axle hub, the shell including a second portion comprising a hub cover, the hub cover projecting axially through the opening, the shell further including means for permanently securing the first portion to the second portion, the wheel being mounted to a utility vehicle by a plurality of lugs and a like plurality of lug nuts, the shell including a like plurality of apertures, each aperture being registered with a lug nut of the wheel, the snap-on dress wheel simulator further including a plurality of lug nut covers and means fastening each lug nut cover to the shell in registration with one of the apertures, the simulator further including means for mounting the shell on the wheel, the means for mounting including retention means for gripping and engaging the utility vehicle wheel free of retentive engagement with vehicle lug nuts.

2. A unitary assembly snap-on dress wheel simulator for utility vehicles as constructed in accordance with claim 1 wherein the means for permanently securing the portions comprises rivet means.

3. A unitary assembly snap-on dress wheel simulator for utility vehicle wheels as constructed in accordance with claim 1 wherein the shell is formed of stainless steel.

4. A unitary assembly snap-on dress wheel simulator for utility vehicle wheels, the simulator comprising a sheet metal shell having a circular periphery, the shell being contoured to generally conform to the shape of a utility vehicle wheel, the shell including a first portion extending from the circular periphery toward the center of the shell, the first portion having a central opening of a dimension suitable to accommodate a utility vehicle axle hub, the shell including a second portion comprising a hub cover, the hub cover projecting axially through the opening, the shell further including means for permanently securing the first portion to the second portion, the simulator further including means for mounting the shell on the wheel, the means for mounting including retention means for gripping and engaging the utility vehicle wheel free of retentive engagement with vehicle lug nuts, the simulator further including a plurality of lug nut covers and means for fastening the lug nut covers to the shell, the means for fastening the lug nut covers to the shell comprising means forming notched apertures in the shell, the lug nut covers including shank portions, each shank portion extending through a notched aperture, the notched apertures having an unstressed diameter less than that of the shank portions and the sheet metal of the shell being biased to grip against the shank portions at the notched apertures.

5. A unitary assembly snap-on dress wheel simulator for a deep dish utility vehicle wheel, the wheel including an axis and a web having an annular planar portion extending transverse to the axis, the wheel further including a rim having a tire bead flange, the tire bead flange being spaced from the annular planar portion of the web a distance in the order of twice the radius of the annular planar portion, the annular planar portion having a central opening, an axle hub extending through the central opening when the wheel is mounted to a vehicle axle, the simulator comprising a sheet metal shell having a circular periphery, the shell being contoured to generally conform to the shape of the deep dish utility vehicle wheel, the circular periphery being adapted to overlie the tire bead flange when the simulator is mounted to the wheel, the shell including a first portion, the first portion extending from the circular periphery axially inwardly, the first portion having an annular gudgeon portion adapted to overlie the annular planar portion of the web when the simulator is mounted to the wheel, the gudgeon portion lying substantially in a transverse plane parallel to the plane of the annular portion, the axial distance between the circular periphery and the plane of the gudgeon portion being in the order of twice the radius of the gudgeon portion, the gudgeon portion including a central opening of a dimension suitable to accommodate the axle hub, the shell further including a second portion, the second portion comprising a hub cover, the hub cover projecting axially through the opening of the gudgeon portion, the shell further including means for permanently securing the first portion to the second portion, the simulator further including means for mounting the shell to the wheel, the means for mounting including a grip ring having a plurality of radially outwardly projecting teeth for gripping the wheel rim, the mounting means further including an annular collar, means securing the grip ring to the collar and means securing the collar to the shell.

6. A unitary assembly snap-on dress wheel simulator as constructed in accordance with claim 5 wherein the means securing the collar to the shell comprises a crimp formed about the periphery of the shell.

7. A unitary assembly snap-on dress wheel simulator for utility vehicles as constructed in accordance with claim 5 wherein the means for permanently securing the first portion to the second portion comprises rivet means.

8. A unitary assembly snap-on dress wheel simulator for utility vehicle wheels as constructed in accordance with claim 5 wherein the shell is formed of stainless steel.

9. A unitary assembly snap-on dress wheel simulator for utility vehicle wheels as constructed in accordance with claim 5 wherein the utility vehicle wheel is mounted to a utility vehicle by a plurality of lugs and a like plurality of lug nuts, the sheet metal shell including a like plurality of apertures, each aperture being registered with a lug nut of the wheel, the simulator further including a plurality of lug nut covers and means fastening each lug nut cover to the shell in registration with one of the apertures.

10. A unitary assembly snap-on dress wheel simulator for utility vehicle wheels as constructed in accordance with claim 5 further including a plurality of lug nut covers and means for fastening the lug nut covers to the shell, the means for fastening the lug nut covers to the shell comprising means forming notched apertures in the shell, the lug nut covers including shank portions, each shank portion extending through a notched aperture, the notched apertures having an unstressed diameter less than that of the shank portions and the sheet metal of the shell being biased to grip against the shank portions at the notched apertures.

* * * * *